(12) United States Patent
Wutte

(10) Patent No.: US 6,868,379 B1
(45) Date of Patent: Mar. 15, 2005

(54) SPEECH RECOGNITION DEVICE WITH TRANSFER MEANS

(75) Inventor: Heribert Wutte, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 643 days.

(21) Appl. No.: 09/786,289

(22) PCT Filed: Jul. 7, 2000

(86) PCT No.: PCT/EP00/06443

§ 371 (c)(1),
(2), (4) Date: Mar. 1, 2001

(87) PCT Pub. No.: WO01/04875

PCT Pub. Date: Jan. 18, 2001

(30) Foreign Application Priority Data

Jul. 8, 1999 (EP) .......................................... 99890231

(51) Int. Cl.[7] .............................................. G10L 15/26
(52) U.S. Cl. ...................... 704/235; 704/244; 704/260
(58) Field of Search ............................... 704/235, 244, 704/260, 231, 246, 251, 252, 253, 254, 270, 275, 276, 278

(56) References Cited

U.S. PATENT DOCUMENTS

| | | | | |
|---|---|---|---|---|
| 5,031,113 A | | 7/1991 | Hollerbauer | 364/513.5 |
| 5,390,278 A | * | 2/1995 | Gupta et al. | 704/243 |
| 5,684,924 A | * | 11/1997 | Stanley et al. | 704/233 |
| 5,799,273 A | * | 8/1998 | Mitchell et al. | 704/235 |
| 5,806,030 A | * | 9/1998 | Junqua | 704/245 |
| 5,884,258 A | * | 3/1999 | Rozak et al. | 704/251 |
| 5,963,903 A | * | 10/1999 | Hon et al. | 704/254 |
| 6,035,270 A | * | 3/2000 | Hollier et al. | 704/202 |
| 6,064,959 A | * | 5/2000 | Young et al. | 704/251 |
| 6,725,194 B1 | * | 4/2004 | Bartosik et al. | 704/235 |

FOREIGN PATENT DOCUMENTS

| | | | |
|---|---|---|---|
| WO | WO9000298 | 11/1990 | G10L/7/08 |

* cited by examiner

Primary Examiner—Susan McFadden

(57) ABSTRACT

In a speech recognition device (1) comprising receiving means (36) for receiving voice information (AI) uttered by a speaker and including speech coefficient storage means (38, 39, 40, 41) for storing a speech coefficient indicator (SKI, PRI, SMI, WI) and including speech recognition means (42) which are arranged for recognizing text information (RTI) which corresponds to the received voice information (AI) by evaluating the voice information (AI) and the speech coefficient indicator (SKI, PRI, SMI, WI), transfer means (54) are now provided which enable to import a speech coefficient indicator (SKI, PRI, SMI, WI) and to store the imported speech coefficient indicator (SKI, PRI, SMI, WI) in the speech coefficient storage means (38, 39, 40, 41).

10 Claims, 3 Drawing Sheets

SPEECH RECOGNITION DEVICE WITH TRANSFER MEANS

The invention relates to a speech recognition device as defined in the introductory part of claim 1 and also to a speech recognition method as defined in the introductory part of claim 8.

Such a speech recognition device and such a speech recognition method are known from the document U.S. Pat. No. 5,031,113. The known speech recognition device includes receiving means which are in the form of a microphone and an audio memory for receiving and storing a speech communication uttered by a speaker during a dictation.

The known speech recognition device further includes speech coefficient storage means in which a speech coefficient indicator is stored which is necessary for executing the speech recognition method. Such a speech coefficient indicator includes context information, speech model information and phoneme reference information. The context information contains all the words that can be recognized by the speech recognition device, the speech model information includes probabilities for the sequence of words of the context information in voice information and the phoneme reference information contains information on how a word portion (phoneme) is pronounced by a speaker.

The known speech recognition device further includes speech recognition means which, when the speech recognition method is executed by an evaluation of the speech coefficient indicator stored in the speech coefficient storage means, are arranged for recognizing text information corresponding to the received voice information and for producing this text information as recognized text information. The recognized text information is displayed by a monitor.

A text processing program and a keyboard form correction means by which recognized text information displayed by the monitor can be corrected and displayed again by the monitor as corrected text information.

The known speech recognition device includes adjusting means for adjusting the speech coefficient indicator for correctly recognizing during a next speech recognition operation words previously recognized erroneously, as a result of an improved adjustment to the speaker and the speech. For adjusting the context information and the speech model information, the corrected text information is evaluated and for adjusting the phoneme reference information also the voice information stored in the audio memory is evaluated to obtain an adjusted speech coefficient indicator and store it in the speech coefficient storage means.

In the known speech recognition device and with the known speech recognition method it has proved to be disadvantageous that a user who would, for example, like to work with the speech recognition device and the speech recognition method both with his computer at the office and with his computer at home, has to train the speech coefficient indicator of both speech recognition devices. Therefore, it takes a relatively long time for both speech recognition devices to be adjusted to the user and the language used and the recognition rate of the speech recognition method is satisfactory.

Furthermore, it would be desirable with a speech recognition device which is in the form, for example, of a computer server connected to the Internet, if the speech recognition device were adjustable to the respective speaker.

It is an object of the invention to provide a speech recognition device and a speech recognition method with which device and method a user can use speech coefficient indicator already trained by the user on another speech recognition device with a speech recognition method. This object is achieved with a speech recognition device as defined in the introductory part of claim 1 by the measures of the characterizing part of claim 1 and with a speech recognition method as defined in the introductory part of claim 8 by the measures of the characterizing part of claim 8.

This achieves that a speech coefficient indicator trained by a user can be exported from a user's first computer which forms a speech recognition device, for example, to a floppy disk and from this floppy disk in his second computer, which also forms a speech recognition device. The speech coefficient indicator may then have been trained, for example, by the user during an initial training of the speech recognition device, in which the user utters predefined text information as voice information into the microphone, after which training means collectively evaluate the uttered voice information with the predefined text information to adjust the speech coefficient indicator to the user and the language spoken by the user.

This achieves the advantage that a user of the speech recognition device and of the speech recognition method who has installed the speech recognition device on two or more computers can export the trained speech coefficient indicator from the computer used last and import this information in the computer to be used from then on. Consequently, when the speech recognition method is executed with the two computers used by one user, the best possible recognition rate is achieved.

Furthermore, this advantageously achieves that a computer server controlled by voice information, which server is connected to the internet, can be adapted to a user in that the computer of the user also connected to the internet exports prior to the transmission of the voice information the speech coefficient indicator stored in the computer and delivers it to the computer server over the internet. The computer server can then import the speech coefficient indicator delivered thereto and store it in speech coefficient storage means, so that the speech recognition device in the form of the computer server is adjusted to the user and a better recognition rate can be achieved.

According to the measures as claimed in claim 3 and claim 10, the training means also utilize any voice information spoken by a user of which text information is recognized by the speech recognition means, which text information was corrected by the user and supplied as corrected text information for training or adjusting the speech coefficient indicator.

This offers the advantage that the speech coefficient indicator is adjusted even better and faster to a user and to the speech uttered by the, user, and a good recognition rate is obtained in a very fast manner.

According to the measures of claim 4 and claim 11, the advantage is obtained that a training indicator of the speech coefficient indicator denotes the extent of the adjustment of the speech coefficient indicator to the user and the speech. The extent of the adjustment may here be given, for example, by the total number of words of predefined or corrected text information already evaluated by the adjusting means, but also by the number of the adjusting operations of the speech coefficient indicator performed by the adjusting means.

According to the measures as claimed in claim 5 and claim 12, the advantage is obtained that with each exported speech coefficient indicator, also the associated training indicator is exported and is rendered available to another speech recognition device.

According to the measures as claimed in claim 6 and claim 13, the advantage is obtained that a speech coefficient indicator is not imported until a comparison of the training indicators of the speech coefficient indicator to be imported and of the speech coefficient indicator stored in the speech coefficient storage means indicates that the speech coefficient indicator to be imported had already been better adjusted to a user than the stored speech coefficient indicator.

According to the measures as claimed in claim 7 and claim 14, the advantage is obtained that a speech coefficient indicator can be exported, for example, by a speech recognition device connected to the internet and be imported over the internet by another speech recognition device connected to the internet.

The invention will be further described in the following with reference to three examples of application of an example of embodiment represented in the Figures, to which, however, the invention is not restricted.

FIG. 1 shows a computer 1 by which a speech recognition program according to a speech recognition method is run, which computer 1 forms a dictating machine with a secondary speech recognition device.

Figure 2:
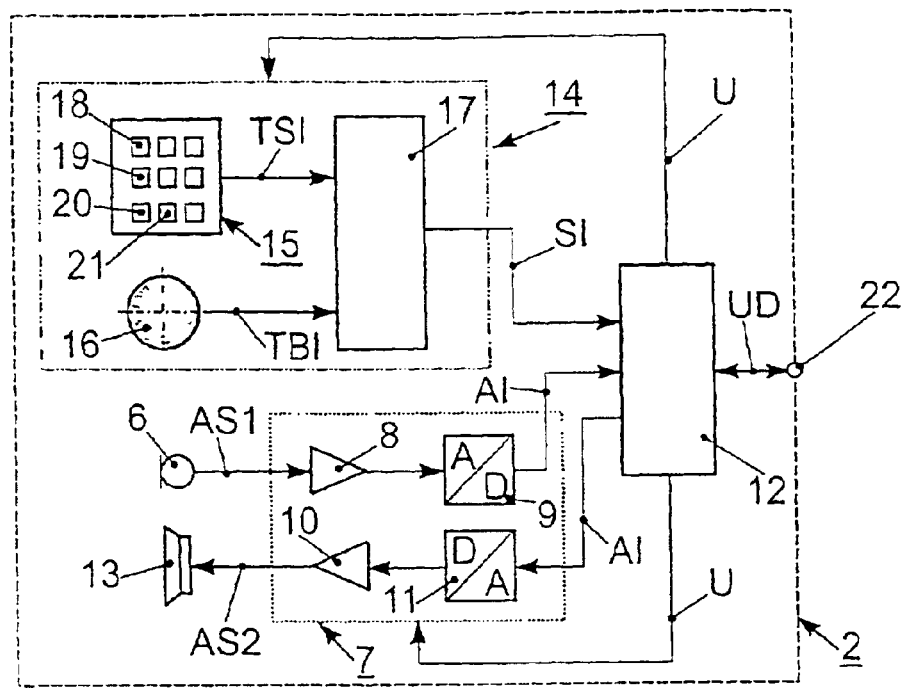
FIG. 2 shows the input unit that can be held in hand as shown in FIG. 1 in the form of a block diagram, which input unit comprises audio processing means for processing an analog audio signal and for delivering digital audio data.

To the computer 1 are connected a dictation microphone 2 which forms an input unit that can be held in hand, a foot switch 3 which forms an input unit that can be actuated by foot, a monitor 4 and a keyboard 5. FIG. 2 shows the dictation microphone 2 in more detail in the form of a block diagram.

The dictation microphone 2 has a microphone 6 which forms audio receiving means and is provided for receiving a speech communication uttered by a user into the microphone 6 and for delivering a first analog audio signal AS1. The dictation microphone 2 further includes audio processing means 7 which are provided for processing the first analog audio signal AS1 and for delivering digital audio data as audio information AI.

The audio processing means 7 include a first amplifier stage 8, an analog-to-digital converter stage A/D 9, a second amplifier stage 10 and a digital-to-analog converter stage D/A 11. The first analog audio signal AS1 can be applied to the first amplifier stage 8 and the amplified first analog audio signal can be applied to the analog-to-digital converter stage A/D 9. The analog-to-digital converter stage A/D 9 is provided for sampling the amplified analog audio signal at a sample rate of 16 kHz and for delivering sampled values in digital audio data which have 16-bit data blocks and can be delivered as audio information AI to USB connecting means 12.

This offers the advantage that the first analog audio signal AS1 is digitized right in the dictation microphone and that the amplifier stage 8 can be adjusted to the maximum output voltage of the microphone.6 as early as in the manufacturing stage of the dictation microphone 2. In this manner, no voice information is lost due to the amplifier stage 8 being overmodulated, so that the digital audio information AI containing the digital audio data has a good quality.

Audio information AI containing a digital audio data can be delivered by the USB connecting means 12 to the digital-to-analog converter D/A 11 of the audio processing means 7. An analog audio signal corresponding to the digital audio data can be delivered by the digital-to-analog converter stage D/A 11, to the second amplifier stage 10. A second analog audio signal AS2 delivered by the second amplifier stage 10 can be applied to a loudspeaker 13 to be reproduced acoustically.

The dictation microphone 2 further includes input means 14 for manually inputting control information SI, which input means include a keyboard 15, a track ball 16 and input processing means 17. The keyboard 15 has, inter alia, a record key 18, a stop key. 19, a fast forward button 20 and a fast backward button 21. The keyboard 15 can be instrumental in giving key information TSI to the input processing means 17.

The track ball 16 is formed by a ball embedded in an opening of the dictation microphone 2, which ball can be rotated by the user for positioning, for example, a cursor displayed on the monitor 4. With the track ball 16 it is possible to feed track ball information TBI to the input processing means 17. The input processing means 17 are provided for processing the key information TSI and track ball information TBI delivered thereto and for delivering respective control information SI to the USB connecting means 12.

The USB connecting means 12 can deliver a supply voltage U both to the audio processing means 7 and to the input means 14 to supply voltage to the stages contained in the audio processing means 7 and the input means 14. This offers the advantage that the dictation microphone 2 receives both information and supply voltage U from the stages of the dictation microphone 2 via only a single cable link.

The USB connecting means 12 are connected via a connection 22 of the dictation microphone 2 to USB connecting means 23 of the computer 1. The USB connecting means 12 of the dictation microphone 2 are arranged for setting up a digital data bus link and, in addition, advantageously for setting up an USB data bus link (Universal Serial Bus: Specification version 1.0 on Jan. 15, 1996, and version 2.0) to the USB connecting means 23 of the computer 1.

On a USB data bus link, error correction codes are added to the audio data of the audio information AI or control data of the control information SI delivered to the USB connecting means 12 or 23, and they are collectively transmitted as transmit data UD to the USB connecting means 23 or 12. The USB connecting means 12 or 23, by which the transmitted data UD were received, is provided for evaluating the error correction codes and for correcting, if necessary, errors in the audio data or the control data, which errors occurred during transmission. In a USB data bus link, control data of control information SI is transmitted at a data transmission rate of 1.5 MB p.s. and audio data of audio information AI at a data transmission rate of 12 MB p.s.

Figure 1:
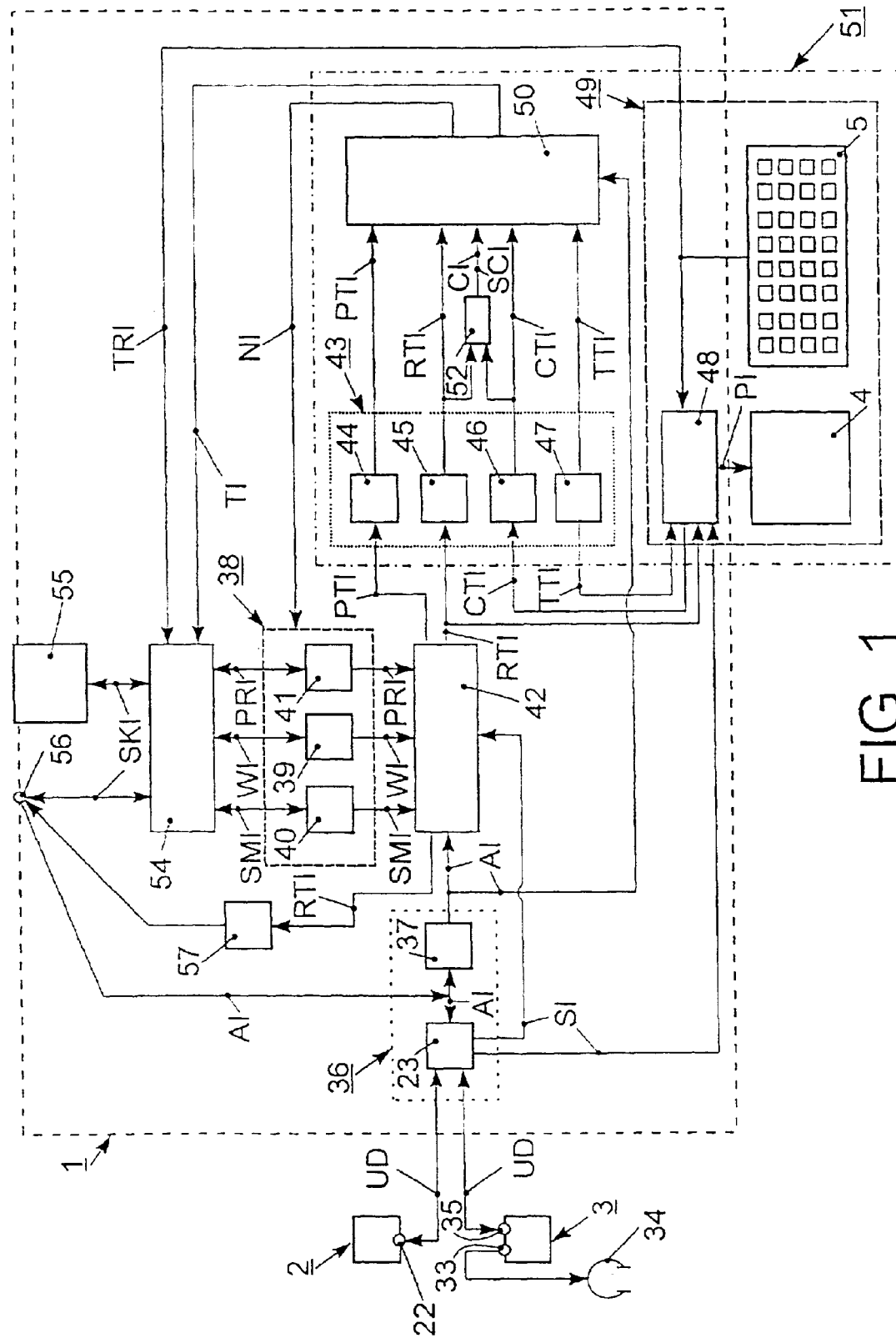
FIG. 1 shows in the form of a block diagram a speech recognition device to which an input unit that can be held in hand and an input unit that can be actuated by foot are connected and which includes text comparing means for comparing recognized-text information with corrected text information, and which includes transfer means for importing, and exporting a speech coefficient indicator.
Figure 3:
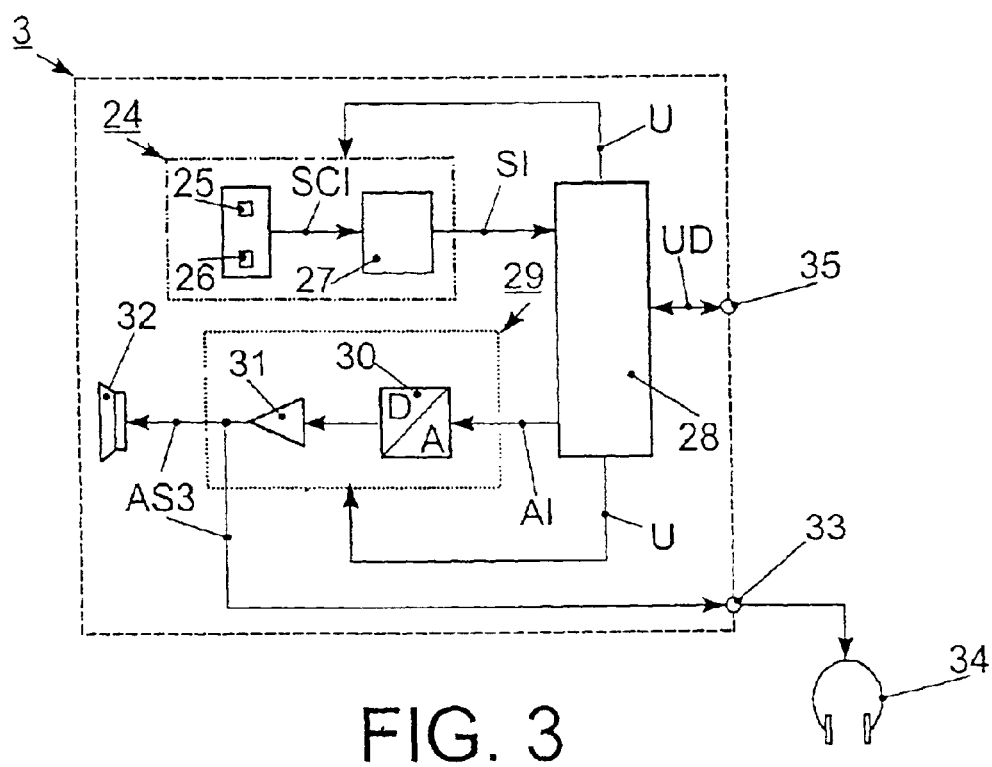
FIG. 3 shows the input unit that can be actuated by foot and is shown in FIG. 1 in the form of a block diagram, to which headphones can be connected and which includes a built-in loudspeaker.

FIG. 3 shows in a detailed manner the foot switch 3 shown in FIG. 1 in the form of a block diagram. The foot switch 3 has input means 24 for inputting control information SI with a foot. The input means 24 contain an audio playback switch 25, a stop switch 26 and input processing means 27. Switch information SCI produced by the audio playback switch or the stop switch 26 can be delivered to the input processing means 27. The input processing means 27 are provided for processing the switch information SCI applied thereto and for applying respective control information SI to USB connecting means 28 of the foot switch 3.

The foot switch 3 further includes audio processing means 29, which comprise digital-to-analog converter stage D/A 30 and a third amplifier stage 31. Audio information AI containing audio data can be applied by the USB connecting means 28 to the digital-to-analog converter stage D/A 30 which delivers to the third amplifier stage 31 an analog audio signal that corresponds to the audio data. A third analog audio signal AS3 delivered by the third amplifier stage 31 can be applied both to a loudspeaker 32 provided in the foot switch 3 and to a first connection 33 of the foot switch. Headphones 34 are connected to the first connection 33. With the loudspeaker 32 and the headphones 34 it is possible to have an acoustic reproduction of a speech communication which will be further discussed hereinafter.

Since the audio processing means 29 are mounted in the foot switch 3, the advantage is obtained that the headphones 34 or a loudspeaker can be directly connected to the foot switch 3. As a result, the computer 1, which also forms a dictating machine, need not have a sound card with audio processing means.

The USB connecting means 28 of the foot switch 3 correspond to the USB connecting means 12 and 23. The USB connecting means 28 can apply a supply voltage U both to the input processing means 24 and to the audio processing means 29 for powering the stages included in the input processing means 24 and the audio processing means 29. This offers the advantage that the foot switch 3 receives communications as well as the supply voltage U over only a single cable link.

The USB connecting means 28 of the foot switch 3 are connected to the USB connecting means 23 of the computer 1 via a second connection 35 of the foot switch. The computer 1 includes receiving means 36 which comprise the USB connecting means 23 and the audio storage means 37 and are arranged for receiving a speech communication pronounced by a speaker. A speech communication uttered by a speaker in the microphone 6 of the dictation microphone 2 can be transmitted from the USB connecting means 12 to the USB connecting means 23 as audio information AI constituted by digital audio data and from the USB connecting means 23 to the audio storage means 37 to be stored as audio information AI. Control information SI applied from the USB connecting means 12 of the dictation microphone 2 or from the USB connecting means 28 of the foot switch 3 to the USB connecting means 23 of the computer 1 can be received by the USB connecting means 23 and delivered to further means of the computer 1 which will be further discussed hereinafter.

The speech recognition device formed by the computer 1 includes speech coefficient storage means 38 provided for storing a speech coefficient indicator SKI. The speech coefficient indicator SKI contains a speech model data SMI, context information WI and phoneme reference information PRI.

The context information WI is stored in context storage means 39 and contains all the words that can be recognized in a speech communication by the speech recognition device and also a word frequency meter which denotes the occurrence probability of the word in a speech communication. The speech model data SMI is stored in speech model storage means 40 and contains word sequences as well as a word sequence frequency meter, which indicates the frequencies of occurrence of these word sequences in a speech communication. Phoneme reference information PRI is stored in phoneme reference storage means 41 and enables an adjustment of the speech recognition device to peculiarities of a speaker's pronunciation.

The speech recognition device further includes speech recognition means 42. The USB connecting means 23 can deliver control information SI to the speech recognition means 42 for activating a speech recognition mode to implement a speech recognition method. With an activated speech recognition mode, the speech recognition means 42 are provided for reading audio information AI stored in the audio storage means 37 and for reading a speech coefficient indicator SKI stored in the speech coefficient storage means 38.

During the execution of the speech recognition method the speech recognition means 42 are provided for evaluating the audio information AI and the speech coefficient indicator SKI. The speech recognition means 42 then determine for each part of the audio information AI a plurality of possible word sequences which correspond to the respective part of the audio information AI where appropriate and produce these possible word sequences for all parts of the audio information AI as possible text information PTI. The possible text information PTI contains, for example, twenty (20) possible word sequences for the audio information AI. Furthermore, the speech recognition means 42—when the speech recognition method is executed—determine each time the most probable word sequence for each part of the audio information AI and produce these most probable word sequences of all the audio information AI as recognized-text information RTI.

The speech recognition device comprises text storage means 43 for storing text information. The text storage means 43 contain possible-text storage means 44, recognized-text storage means 45, corrected-text storage means 46 and training-text storage means 47. Possible-text information produced by the speech recognition means 42 during the execution of the speech recognition method can be stored in the possible-text storage means 44 and recognized-text information RTI can be stored in the recognized-text storage means 45.

The computer 1 is further arranged for running a text-processing program—such as, for example, Word For Windows 95—and forms text processing means 48. Recognized-text information RTI produced by the speech recognition means 42 during the execution of the speech recognition method can be fed to the text processing means 48. The text processing means 48 are then arranged for transferring picture information PI containing the recognized-text information RTI to the monitor 4.

With the input means 14 of the dictation microphone 2 there can be input control information SI which can be applied to the speech recognition means 42 and the text processing means 48 and which activates a correction mode of the speech recognition device. The text processing means 48, the monitor 4 and the keyboard 5 here constitute correction means 49. When the correction mode is activated, a user can, by means of the keyboard 5, correct the recognized-text information RTI and store corrected text information CTI in the corrected-text storage means 46, which will be further discussed hereinafter.

In the training-text storage means 47 is stored training-text information TTI which contains typical words of phrases or word sequences of a certain domain (business letters; field of study: radiology; field of study: law . . . ). Control information SI can be input by the input means 14 of the dictation microphone 2, which control information can be applied to the speech recognition means 42 and the text processing means 48 and activates an initial training mode of the speech recognition device.

When the initial training mode is activated, the text processing means 47 are arranged for reading out the training-text information TTI from the training-text storage means 47 and for feeding respective picture information PI to the monitor 4. A user can then utter the training text displayed on the monitor 4 into the microphone 6 to adjust the speech recognition device to the user's type of pronunciation.

The speech recognition device has adjusting means 50 for adjusting the speech coefficient indicator SKI stored in the speech-coefficient storage means 38 to the type of pronunciation of the user and also to words and word sequences commonly used by the user. The text storage means 43, the correction means 49 and the adjusting means 50 together form the training means 51. Such an adjustment of the speech coefficient indicator SKI takes place when the initial training mode is activated in which the training-text information TTI read by the user is known.

Figure 4:
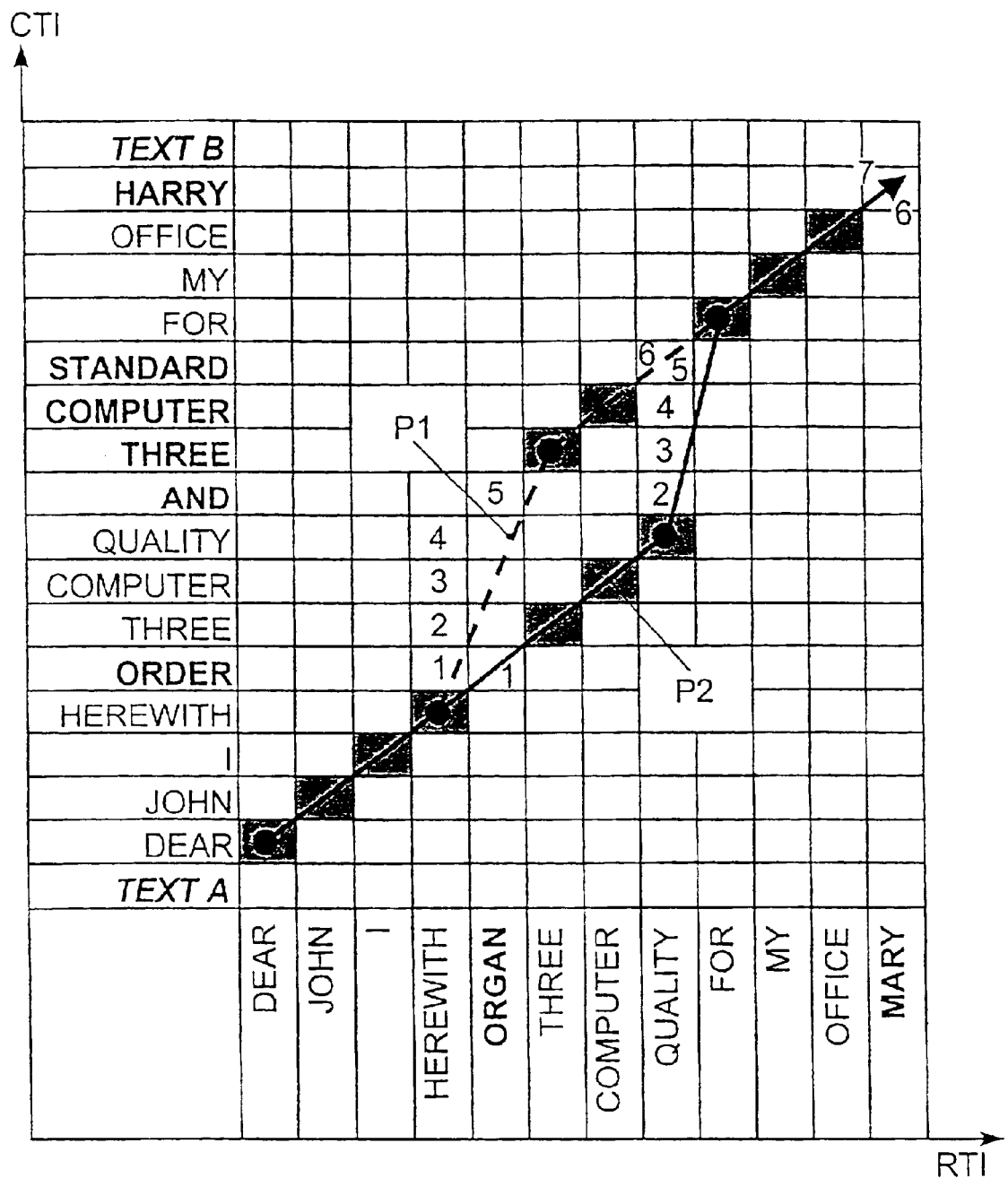
FIG. 4 shows an adjustment table established by the text comparing means of the speech recognition device, in which table recognized-text information and corrected text information has been entered.

Such an adjustment, however, also takes place in an adjustment mode in which text information corresponding to voice information is recognized as recognized-text information RTI and is corrected by the user into corrected text information CTI. For this purpose, the training means 51 include text comparing means 52, which are arranged for comparing the recognized-text information RTI with the corrected text information CTI and for determining at least a correspondence indicator CI. In the text comparing means 52 an adjustment table 53 shown in FIG. 4 is established when the adjustment mode is on, which table will be further explained hereinafter.

The result of the adjustment, which is adjustment information NI, can be sent by the adjusting means 50 to the speech coefficient storage means 38, which adjustment information adjusts the stored speech coefficient indicator SKI. A training indicator TI can further be sent by the adjusting means 50 of the training means 51, which training indicator TI indicates the extent of the adjustment of the speech coefficient indicator SKI stored in the speech coefficient storage means 38. The training indicator TI contains information about how often and in how many words the speech coefficient indicator SKI stored in the speech coefficient storage means 38 has already been adjusted to a user. The more often the speech coefficient indicator SKI has been adjusted to a user, the better the recognition rate of the speech recognition device is for this user.

The speech recognition device includes transfer means 54 which enable to import a speech coefficient indicator SKI and store the imported speech coefficient indicator SKI in the speech coefficient storage means 38 and/or export the speech coefficient indicator SKI stored in the speech coefficient storage means 38. For this purpose, the user can input transfer information TRI by the keyboard 5 and send it to the transfer means 54, which will be further discussed hereinafter.

With reference to a first example of application, the function is further explained of the dictation microphone 2, the foot switch 3 and the dictating machine and speech recognition device formed by the computer. In accordance with the first example of application it is assumed that the user of the computer 1 would like to dictate a letter to order three computers of the "Quality" type with his acquaintance "John". For this purpose, the user touches the record key 18 of the dictation microphone 2 and dictates "Dear John I herewith order three Quality computers for my office Harry", Audio information AI corresponding to this voice information is then transmitted from the dictation microphone 2 as transmit data UD to the USB connecting means 23 and is finally stored in the audio storage means 37. During this operation, the dictation microphone 2 and the computer 1 constitute a dictating machine.

By actuating the record key 18 of the dictation microphone 2, control information SI activating the speech recognition mode of the speech recognition means 42 is applied by the dictation microphone 2 as transmit data UD over the USB connecting means 23 to the speech recognition means 42. In the speech recognition mode activated in the speech recognition means 42, the audio information AI stored in the audio storage means 37 is read out and evaluated together with the speech coefficient indicator SKI read from the speech coefficient storage means 38. The speech recognition means 42 then determine a plurality of possible word sequences as possible text information PTI and store them in the possible-text storage means 44. For the first part of the audio information AI, the possible text information PTI could contain, for example, the word sequences "Hear John why", "Dear John I" and "Bear John hi".

The speech recognition means 42 determine the text information "Dear John I herewith organ three Quality computers for my office Mary" as most probable text information and deliver it as recognized-text information RTI to the recognized-text storage means 45. The uttered word "order" was erroneously recognized as the word "organ" and the uttered word "Harry" as the word "Mary".

The recognized-text information RTI recognized by the speech recognition means 42 and stored in the recognized-text storage means 45 is then read out by the text processing means 48 and displayed on the monitor 4. The user recognizes that the two uttered words "order" and "Harry" were recognized erroneously and he/she would like to correct the recognized-text information RTI, because of which the user activates with the input means 14 of the dictation microphone 2 the correction mode of the speech recognition device.

When the correction mode is activated, the user can, by touching the audio playback switch 25 of the foot switch 3 acoustically play back the audio information AI stored in the audio storage means 37 by means of the headphones or the loudspeaker 32, while the text information recognized from the audio information AI is featured on the monitor 4 in synchronism with the played back audio information AI. Such synchronous editing or correction has been known for a long time.

In a first type of correction of the recognized-text information RTI by the user, the user corrects only the erroneously recognized words "organ" and "Mary" into the two originally uttered words "order" and "Harry" and corrected text information CTI is constructed in the text processing means 48 and stored in the corrected-text storage means 46. This corrected text information CTI stored in the corrected-text storage means 46 after the first correction step would be highly suitable for adjusting the speech coefficient indicator SKI. The words "order" and "Harry" uttered by the user in a further dictation would be correctly recognized in a next speech recognition operation with the previously adjusted speech coefficient indicator SKI.

As practice shows, users also make other corrections of a second type when the correction mode is activated. According to the first example of application it has been assumed that the user now remembers that he wishes to order three computers of the "Standard" type, because of which the user inserts the word sequence "and three Standard computers" into the already corrected text information CTI by means of the keyboard 5. Furthermore, the user copies a text A prior to the beginning of the already corrected text information CTI, which text A contains the address of the letter to his acquaintance "John". Finally, the user copies a text B after the already corrected text information CTI in the corrected text information CTI, which contains a foot note about agreed discount percentage customary with such orders.

The user then adds text parts to the recognized-text information RTI, which text parts do not have any connection with the voice information uttered by the user during the dictation. Such text parts that must not be evaluated for adjusting the phoneme reference information PRI, because no corresponding audio information AI has been stored in the audio storage means 37. Furthermore, it is no good adjusting the context information WI or the speech model data SMI with such text parts, because the text A and the text B are often contained in the user's corrected text information CTI, but are hardly ever uttered by the user in dictations.

If the context information WI and the speech model data SMI were trained with text parts, which do not have any connection with the voice information, for example the word sequence of the street name "Hell Road" contained in the text A of the address of the acquaintance John would have a high probability of occurrence, because the user often writes letters to John and always copies the address in the corrected text information CTI. A word sequence "Hello Rod" uttered in a dictation would, however, be easily recognized erroneously, because the word sequence "Hello Rod" in the speech model storage means 40 would have a relatively lower probability of occurrence than the word sequence "Hell road", although the word sequence "Hello Rod" occurs relatively frequently in the user's dictations.

After the user has made all the corrections desired by him and after the corrected text information CTI has been stored in the corrected-text storage means 46, the user touches a key of the keyboard 15 of the dictation microphone 2 to activate the adjustment mode of the speech recognition device and adjust the speech coefficient indicator SKI of the speech recognition device. The dictation microphone 2 then applies respective control information SI to the speech recognition means 42 via the USB connection means 23.

In the adjustment mode activated in the speech recognition device, the adjusting means 50 are arranged for reading the audio information AI stored in the audio storage means 37, such as the possible text information PTI, recognized-text information RTI and corrected text information CTI stored in the text storage means, 43. Furthermore, the text comparing means 52 in the activated adjustment mode, are arranged for providing the adjustment table 53 shown in FIG. 4, to determine a text part of the corrected text information CTI that is suitable for adjusting the speech coefficient indicator SKI.

For this purpose, first the recognized-text information RTI and the corrected text information CTI is written in the adjustment table 53, while erroneously recognized words as well as corrected and inserted words and text parts are represented in bold type. The text comparing means 52 are provided for comparing the recognized-text information RTI and the corrected text information CTI and for featuring corresponding words by grey fields at the respective position of the adjustment table 53. The text part having the words "three computers" of the recognized-text information RTI is found twice in the corrected text information CTI.

Furthermore, the text comparing means 52, when comparing the recognized-text information RTI and the corrected text information CTI, are provided for determining a correspondence indicator CI for each text part. The text comparing means 52 then determine how many matching words featured by a grey field a text part contains. Furthermore, the text comparing means 52 determine penalty points for each text part, with one penalty point being awarded for each insertion, deletion or substitution of a word in the corrected text information CTI. The correspondence indicator CI of the text part is determined from the number of the corresponding words and penalty points of a text part.

In the text comparing means 52 is determined a minimum value MW for the correspondence indicator CI, which minimum value is fallen short of when for a text part more than three penalty points are awarded for corrections of adjacent words of the corrected text information CTI. For the adjustment of the speech coefficient indicator SKI, only text parts are used whose correspondence indicator CI exceeds the minimum value MW.

The text comparing means 52 evaluate the adjustment table 53 and recognize that all the words of the text A and of the text B were inserted into the corrected text information CTI, because of which the text comparing means 52 award to the text A and the text B a number of penalty points that corresponds to the number of words of text A and of text B. The text comparing means 52 therefore apply a correspondence indicator CI for the text A and the text B to the adjusting means 50, which indicator value is smaller than the minimum value MW. This offers the advantage that a text part of the corrected text information CTI, which part has absolutely no connection with the voice information, is not used for the adjustment of the speech coefficient indicator SKI.

According to the adjustment table 53, text parts which can be used for an adjustment of the speech coefficient indicator SKI are not dwelling on a path P1 and a path P2 of the corrected text information CTI.

The path P1 contains a first text part "Dear John I herewith", which does not get any penalty points from the text comparing means 52 and whose correspondence indicator therefore exceeds the minimum value MW. The path P1 contains a second text part "order three Quality computers and" after the first text part, which second text part is awarded five penalty points (1) to (5) for the insertion of the words "order three Quality computers" and the substitution of the word "and" for the word "organ", and whose correspondence indicator therefore falls short of the minimum value MW. The path P1 contains after the second text part a third text part "three Standard computers for my office Harry" which is awarded only one penalty point (6) for the insertion of the word "Standard" and whose correspondence indicator CI therefore exceeds the minimum value MW. The path P1 therefore contains the first and the third text part which are in principle suitable for an adjustment of the speech coefficient indicator SKI.

The path P2 contains a fourth text part "Dear John I herewith order three Quality computers", which obtains only one penalty point (1) from the text comparing means 52 for the substitution of the word "order" for the word "organ", and whose correspondence indicator CI therefore exceeds the minimum value MW. The path P2 contains after the fourth text part a fifth text part "and three Standard computers", which obtains four penalty points (2) to (5) for the insertion of this word and whose correspondence indicator therefore falls short of the minimum value MW. The path P2 contains after the fifth text part a sixth text part "for my office Harry", which is awarded one penalty point (6) for the substitution of the word "Harry" for the word "Mary" and whose correspondence indicator CI exceeds the minimum value MW. The path P2 therefore contains the fourth and the sixth text parts which are suitable, in principle, for an adjustment of the speech coefficient indicator SKI.

The text comparing means 52 are provided for determining the text parts of the path P1 or P2 that have the largest summed correspondence indicator SCI. For this purpose, the text comparing means 52 determine that nine words of the path P1 and ten words of the path P2 of the corrected text information CTI completely correspond with the words of the recognized-text information RTI and are featured as a grey field in the adjustment table 53. Furthermore, the text comparing means 52 add up the penalty points of each path, where seven penalty points are determined for the path P1 and six penalty points for the path P2.

Finally, the text comparing means 52 determine that the text information of the path P2 having ten corresponding words and only six penalty points have a larger summed correspondence with the recognized-text information RTI and supply a respectively higher summed correspondence indicator SCI for the text parts of the path P2 to the adjusting means 50.

This offers the advantage that for the adjustment of the speech coefficient indicator SKI words corrected according to a first type of correction—such as, for example, "order" and "Harry"—are used for the adjustment and text parts corrected according to the second type of correction—such as, for example, "and three Standard computers" that do not have any connection with the voice information—are not used for the adjustment. As a result, the speech coefficient indicator SKI is adjusted very rapidly and well to the peculiarities of the pronunciation of a user and typical formulation of a user, while a particularly good recognition rate of the speech recognition device is achieved.

The adjusting means 50 in the adjustment mode activated in the speech recognition device are arranged, after the summed correspondence indicator SCI is received from the text comparing means 52, for reading the text parts of the path P2 of the connected text information CTI from the corrected-text storage means 46 and for evaluating these text parts.

For adjusting the context information WI, to the frequency meter values, of which each one is assigned to a word of the fourth and sixth text parts "Dear", "John", "I", . . . "Harry" of the word "order" P2, and stored together with the respective word in the context storage means 39, the frequency meter value features the probability of occurrence of the respective word in a dictation of the user. When a word of the text part used for the adjustment is dictated by the user for the first time, it is stored in the context storage means 39 together with the value "1" of a frequency meter.

For adjusting the speech model data SMI stored in the speech model storage means 40, for example, the stored frequency meter value assigned to the word sequence "I herewith order" is increased by the value "1" to feature a higher probability of occurrence of such a formulation in a dictation of the user.

For adjusting the phoneme reference information PRI stored in the phoneme reference storage means 41, only those words of the fourth and sixth text parts of the word sequence P2 are evaluated in combination with the associated audio information AI that fully correspond to a word of the recognized-text information RTI and are featured in the adjustment table 53 by a grey field. In addition, also words of the possible text information PTI with the associated audio information AI can be evaluated. For this purpose, the adjusting means 50 check whether a word ("order", "Harry") substituted by the user with the first type of correction is stored for this part of the audio information AI in the possible-text storage means 44. If such a word is found in the possible-text storage means 44, also this word with the associated audio information AI is evaluated for adjusting the phoneme reference information PRI.

Adjustable information NI containing these adjustments is then applied by the adjusting means 50 to the speech coefficient storage means 38 for adjusting the speech coefficient indicator SKI. Similarly, the adjusting means 50 apply a training indicator TI to the transfer means 54, which indicator features with how many words the speech coefficient indicator SKI already stored in the speech coefficient storage means 38 has already been trained. This offers the advantage that by means of the training indicator TI it is immediately clear whether the speech recognition device has already been adjusted well to a user and will thus in all probability have a good recognition rate for this user.

According to a second example of application it is assumed that the user of the speech recognition device formed by the computer 1 additionally has a second computer which forms a second speech recognition device. The user would obviously like to achieve an equally good recognition rate on the second speech recognition device as he has already achieved with the speech recognition device formed by the computer 1, whose speech recognition information SKI he has trained for several months.

For this purpose, the user actuates a key of the keyboard 5 after which transfer information TRI is delivered by the keyboard 5 to the transfer means 54. The transfer means 54 are then used for reading the speech coefficient indicator SKI stored in the speech coefficient storage means 38. The transfer means 54 are further used for storing the read speech coefficient indicator SKI and the training indicator TI of the speech coefficient indicator SKI on a disk 55 inserted into a disk drive of the computer 1.

This offers the advantage that a speech coefficient indicator SKI stored in the speech coefficient storage means 38 and already trained by the user can be exported from the computer 1. Furthermore, the speech coefficient indicator SKI can be imported into the user's second computer. As a result, a user can further use a speech coefficient indicator SKI trained by him in as many other computers as he likes, which computers form a speech recognition device that corresponds to the speech recognition device shown in FIG. 1, and obtain in this manner also with these computers a good recognition rate of the speech recognition device.

Advantageously, when a speech coefficient indicator SKI is exported, the training indicator TI of the speech coefficient indicator SKI is exported along, while, when the speech coefficient indicator SKI is imported from the transfer means 54 there can be verified for the time being whether the speech coefficient indicator SKI to be imported has already been better trained than the speech coefficient indicator SKI stored in the speech coefficient storage means 38. The transfer means 54 import the speech coefficient indicator SKI only in the case where the test proves that the speech coefficient indicator SKI to be imported has already been better trained than the speech coefficient indicator SKI stored in the speech coefficient storage means 38.

According to a third example of application it is assumed that the computer 1 forms an Internet server connected to the Internet and is connected to the Internet by a connection 56 of the computer 1. It is farther assumed that the user of a further computer, which forms a dictating machine, has queried text information from a home page of the Internet server stored in home page storage means 57 of the computer 1, and that this text information was delivered to the further computers via the connection 56 of the computer 1. This text information from the home page contains link information with which further text information stored in the home page storage means 57 can be queried, as this is generally done. The speech recognition device of the Internet server shown in FIG. 1 enables the user of the further computer to activate link information shown on the home page by voice information fed by the further computer.

According to the third example of application it is further assumed that the user would like to activate the link information "hotels" shown on the home page. For this purpose, the user actuates a record key of a dictation microphone of the further computer and pronounces the voice information "hotel" into the microphone of the dictation microphone. Audio information AI contained in this voice information is applied to the computer 1 via its connection 56 and the audio information AI is stored in the audio storage means 37. In the speech recognition mode of the speech recognition device of the computer 1 activated by this voice information, the word "hotels" is recognized as recognized-text information RTI by the speech recognition means 42, and the text information assigned to this link information is carried from the home page storage means 57 via the connection 56 of the computer 1 to the user's further computer.

Before the speech-recognition mode is activated, the speech coefficient indicator SKI exported by the further computer and applied to the connection 56 via the Internet is now advantageously imported in the computer 1 by the transfer means 54. As a result, the Internet server formed by the computer 1 is adjusted to the respective user, which is why an extremely high recognition rate is achieved.

It may be observed that the speech coefficient indicator SKI of a user can be co-transmitted with each audio information AI transmitted to the Internet server. However, it is particularly advantageous to transmit to the Internet server the speech coefficient indicator SKI of a user only the first time the home page of the Internet server is queried, and to store the speech coefficient indicator SKI in the Internet server for this user. With each further reception of audio information AI from the further computer of this user, the Internet server can use the already stored speech coefficient indicator SKI for the speech recognition.

It may be observed that the adjustment mode for adjusting the speech coefficient indicator SKI can also be activated automatically after corrected text information CTI has been stored, or by the user via a key of the keyboard 5 of the computer 1.

It may be observed that there are also other possibilities of determining a correspondence value of a text part or a summed correspondence value of text parts of a path than the possibilities described with reference to the example of embodiment. Furthermore, the conclusion that the minimum value MW is fallen short of when three consecutive penalty points are awarded is only to be understood as an example. Similarly, a number of penalty points exceeding a certain number of penalty points in ascertain number of words of a text part could also be defined as a falling short of the minimum value MW.

It may be observed that for adjusting the speech coefficient indicator SKI it may also be advantageous to use only certain sections of a text part which is in principle suitable for adjusting the speech coefficient indicator SKI, the determination of which text part being explained with reference to the first example of embodiment for adjusting the speech coefficient indicator SKI. For example, only words are used to which a penalty point was awarded by the text comparing means 52 and words featured in the adjustment table 53 by a grey field adjacent these words.

This offers the advantage that words ("order", "Harry") recognized wrongly during the speech recognition operation and corrected (substituted) by the user, and words adjacent these words are used for the adjustment. Sections of the corrected text information CTI of text parts in principle suitable for the adjustment which fully correspond to the recognized-text information RTI, are not used here for the adjustment, because these sections may not have been corrected by the user at all.

It may be observed that input means of a handheld input device may also be arranged for applying control information to a computer, to call the computer up from a power-save mode to an active mode.

It may be observed that also a foot-operated input device may be used in general for activating operating modes in the computer. The computer could form a television receiver and a television channel could be selected by the foot switch, on which channel a television broadcast is received which is displayed by the monitor.

It may be observed that also a microphone or a loudspeaker, to which USB connecting means of the input device can be connected, can be connected to a foot-operated input device when the microphone or the loudspeaker also has USB connecting means. In this case it is not necessary for the foot-operated input device to comprise audio processing means, because, for delivering an analog audio signal, audio processing means are then arranged in the microphone and the loudspeaker.

It may be observed that a digital data bus link can also be formed by a radio frequency radio link such as, for example, in accordance with the Bluetooth Specification (Bluetooth Special Interest Group, May 1998). This offers the advantage that no cable link is necessary any longer between the input device and a computer.

It may be observed that also a loudspeaker can be connected to the first connection 33 of the foot switch 3.

What is claimed is:

1. A speech recognition device comprising:
    receiving means for receiving voice information uttered by a speaker;
    speech coefficient storage means for storing a speech coefficient indicator;
    speech recognition means arranged for determining text information which corresponds to the received voice information by means of an evaluation of the voice information and of the speech coefficient indicator; and
    transfer means to enable importing a speech coefficient indicator and storing the imported speech coefficient indicator in the speech coefficient storage means;
    a training means for training the stored speech coefficient indicator by evaluating at least text information and in that the transfer means enable to export the speech coefficient indicator stored in the speech coefficient storage means and for generating a training indicator which denotes the extent of adjustment of the speech coefficient indicator stored in the speech coefficient storage means.

2. A speech recognition device as claimed in claim 1, wherein the training means includes correction means for correcting the recognized text information and for delivering corrected text information and adjusting means for adjusting the stored speech coefficient indicator by an evaluation of at least the corrected text information.

3. A speech recognition device as claimed in claim 1, wherein the transfer means, when a speech coefficient indicator stored in the speech recognition storage means is exported, are additionally arranged for exporting the training indicator of the exported speech coefficient indicator.

4. A speech recognition device as claimed in claim 1, wherein the transfer means, when a speech coefficient indicator is imported, are arranged for comparing an imported training indicator and a training indicator generated by the training means, and in that only when the comparison of the training indicators shows that the imported speech coefficient indicator was trained to a larger extent than the stored speech coefficient indicator, can the transfer means store the imported speech coefficient indicator in the speech coefficient storage means.

5. A speech recognition device as claimed in claim 1, wherein the transfer means can be connected to a computer network.

6. A speech recognition method for recognizing text information which corresponds to voice information, the method comprising the following steps:

receiving voice information;

evaluating the received voice information and stored speech coefficient indicator and delivering recognized-text information; and wherein a speech coefficient indicator is imported, stored and trained by an evaluation of at least one piece of text information and in that the stored speech coefficient indicator is exported, and wherein a training indicator is generated which denotes the extent of the adjustment of the stored speech coefficient indicator.

7. A speech recognition method as claimed in claim 6, wherein the training of the stored speech coefficient indicator includes both a correction of the recognized text information and delivering corrected text information and adjusting the stored speech coefficient indicator by evaluating at least the corrected text information.

8. A speech recognition method as claimed in claim 7, wherein the generated training indicator is exported together with the stored speech coefficient indicator.

9. A speech recognition method as claimed in claim 7, wherein when a speech coefficient indicator is imported, the imported training indicator and the generated training indicator of the stored speech coefficient indicator are compared and in that the imported speech coefficient indicator is not stored until the comparison of the training indicators shows that the imported speech coefficient indicator was trained to a larger extent than the stored speech coefficient indicator.

10. A speech recognition method as claimed in claim 6, wherein a speech coefficient indicator can be imported from a computer network and stored.

* * * * *